United States Patent Office.

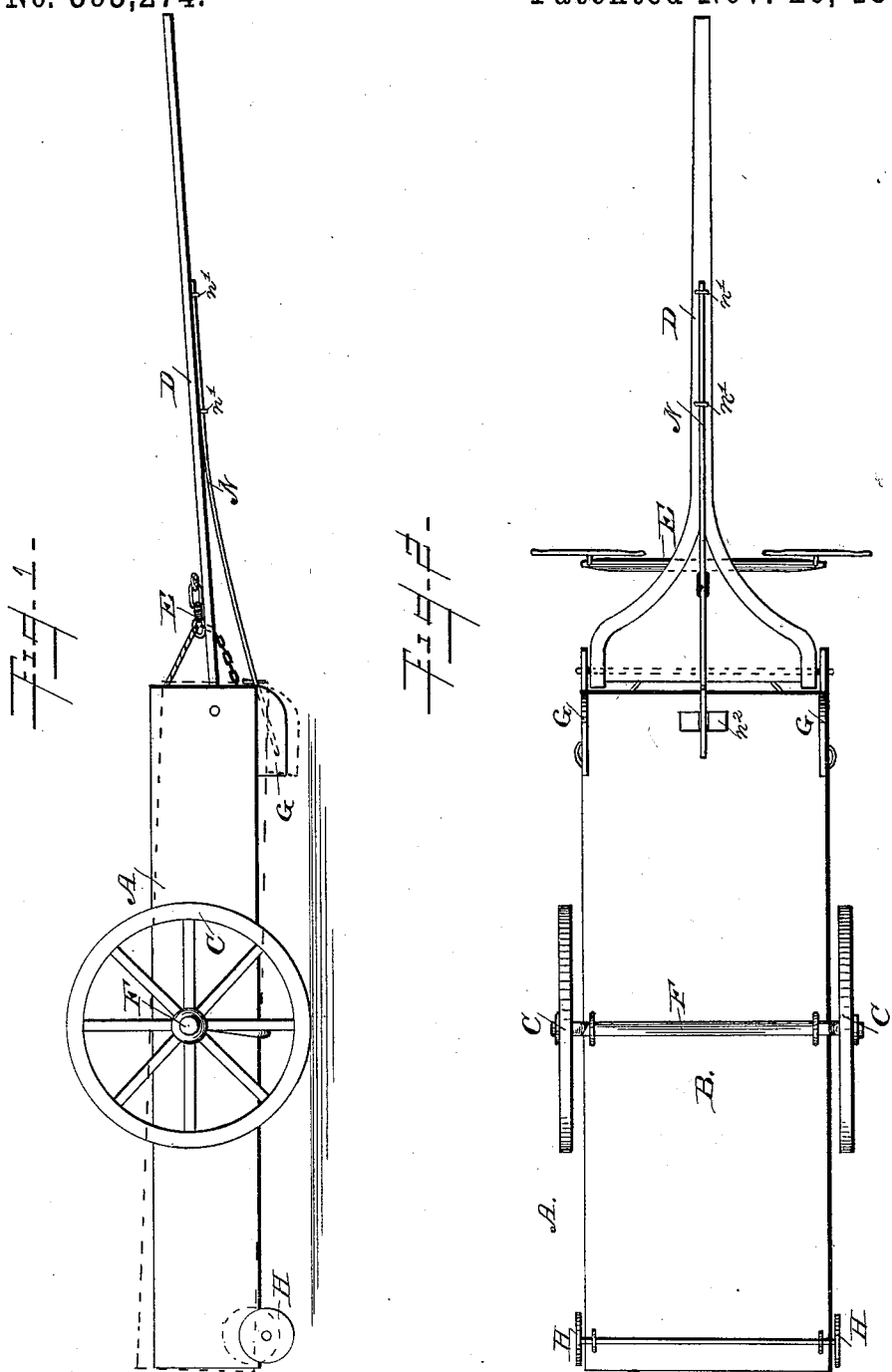

JOHN H. TIFFANY, OF BROOKLYN, PENNSYLVANIA.

BODY-SUPPORT FOR CARTS.

SPECIFICATION forming part of Letters Patent No. 393,274, dated November 20, 1888.

Application filed March 20, 1888. Serial No. 267,830. (No model.)

*To all whom it may concern:*

Be it known that I, JOHN H. TIFFANY, a citizen of the United States, residing at Brooklyn, in the county of Susquehanna and State of Pennsylvania, have invented certain new and useful Improvements in Tongue and Body Supports; and I do hereby declare the following to be a full, clear, and exact description of the invention, such as will enable others skilled in the art to which it appertains to make and use the same.

My invention relates to means for adjusting and balancing a cart or similar centrally-supported vehicle; and it consists in the combination, with the body of the vehicle and the tongue, of a spring, as hereinafter described and claimed, arranged in such manner as to transfer the weight of the tongue or thills, whiffletrees, neck-yoke, harness, or other part from the team to the vehicle when the front end of the vehicle is raised to the desired height and to balance the vehicle.

I have illustrated this invention as applied to a class of vehicles for which I obtained Letters Patent Nos. 297,876 and 308,933, of 1884, for which it is especially adapted. The form of spring described and here claimed is also shown and described in connection with such a vehicle and other appliances in my application, Serial No. 241,101, filed June 13, 1887.

Figure 1 is a side elevation; Fig. 2, a plan.

In the drawings, A represents the body of the vehicle; B, the bottom; C, large central wheels; D, a tongue; E, the whiffletrees; F, a cranked axle; G, a runner, and H small wheels at opposite ends of the vehicle. N represents a spring, of elastic wood, metal, or other material, used to convey the weight of the thills, tongue, whiffletrees, neck-yoke, &c., from the team to the front end of the vehicle. It is a single spring, consisting, preferably, of a steel rod, at one end secured to the under portion of the tongue by clips $n'$, while the other end passes under the center of the front end of the cart, is unconfined, and rests on a grooved block, $n^2$. The spring is prevented from slipping back by a pin, $G'$, put through the spring and which comes against the front end of the body or frame. The fulcrum of the spring should be located near the point where the tongue unites with the vehicle.

When the front end of the vehicle is low, as shown by dotted lines, Fig. 1, the spring does not convey any weight thereto; but about the time the front end comes to a proper or a desired height on a level with the tongue or a little above such line the spring transfers the weight of the tongue and other parts carried by the team to the front end of the vehicle, and at the same time prevents the front end of the vehicle from rising too high, whereby the vehicle is adjusted and balanced at the proper position. Another object of this spring is to prevent the thills or tongue from rising high enough to interfere with the team when the front end of the vehicle passes over a large obstruction or when raised high by other means.

I am aware that it is old to use spring tongue-supports on wagons; but I am not aware that a spring-support has been used with a cart or other centrally sustained or supported wheeled vehicle, or for the purpose of balancing it, as before described.

What I claim is—

1. In combination with a centrally-supported vehicle body or frame and the jointed tongue, a spring tongue-support connected to the tongue at one end and at the other end directly to said body or frame, substantially as described, and for the purpose set forth.

2. In combination with a centrally supported and balanced vehicle body or frame, a spring-tongue for the purpose of supporting and balancing said body or frame, substantially as described.

In testimony whereof I affix my signature in presence of two witnesses.

JOHN H. TIFFANY.

Witnesses:
 AMOS NICHOLS,
 WILL H. WARNER.